US006691279B2

(12) United States Patent
Yoden et al.

(10) Patent No.: US 6,691,279 B2
(45) Date of Patent: Feb. 10, 2004

(54) DOCUMENT PREPARATION METHOD AND MACHINE TRANSLATION DEVICE

(75) Inventors: Naoyuki Yoden, Moriguchi (JP); Takeshi Yumura, Moriguchi (JP); Kouzou Ohi, Moriguchi (JP)

(73) Assignee: Sanyo Electric Co., LTD, Osaka (JP)

( * ) Notice: Subject to any disclaimer, the term of this patent is extended or adjusted under 35 U.S.C. 154(b) by 0 days.

(21) Appl. No.: 09/077,431
(22) PCT Filed: Mar. 30, 1998
(86) PCT No.: PCT/JP98/01502
§ 371 (c)(1),
(2), (4) Date: May 29, 1998
(87) PCT Pub. No.: WO98/44433
PCT Pub. Date: Oct. 8, 1998

(65) Prior Publication Data
US 2002/0007383 A1 Jan. 17, 2002

(30) Foreign Application Priority Data
Mar. 31, 1997  (JP) .............................................. 9-80533

(51) Int. Cl.[7] .............................................. G06F 17/21
(52) U.S. Cl. ...................................... 715/501.1; 715/513
(58) Field of Search ............................... 707/501, 513, 707/515, 516, 523, 532; 704/1, 2–10; 345/340, 171; 715/501.1, 513, 516, 523, 532

(56) References Cited

U.S. PATENT DOCUMENTS

| 4,218,760 | A | * | 8/1980 | Levy ........................... 715/532 |
| 4,481,607 | A | * | 11/1984 | Kobayashi et al. ............ 704/7 |
| 5,214,583 | A | * | 5/1993 | Miike et al. .................... 704/4 |
| 5,530,852 | A | * | 6/1996 | Meske, Jr. et al. ....... 364/280.4 |
| 5,659,765 | A | * | 8/1997 | Nii ................................ 704/4 |
| 5,710,883 | A | * | 1/1998 | Hong et al. ................. 709/206 |
| 5,727,156 | A | * | 3/1998 | Herr-Hoyman et al. ....... 707/10 |
| 5,781,901 | A | * | 7/1998 | Kuzma ........................ 358/402 |
| 5,790,793 | A | * | 8/1998 | Higley ....................... 707/513 |
| 5,852,798 | A | * | 12/1998 | Ikuta et al. ..................... 704/2 |
| 5,862,325 | A | * | 1/1999 | Reed et al. .................. 395/200 |
| 5,930,479 | A | * | 7/1999 | Hall ............................ 709/206 |
| 5,937,163 | A | * | 8/1999 | Lee et al. ............... 707/514 X |
| 5,986,654 | A | * | 11/1999 | Alexander et al. .......... 345/349 |
| 5,995,105 | A | * | 11/1999 | Reber et al. ................. 707/513 |
| 6,061,701 | A | * | 5/2000 | Hirai et al. .................. 715/536 |

FOREIGN PATENT DOCUMENTS

| JP | 2228766 A | 9/1990 |
| JP | 4299768 A | 10/1992 |
| JP | 535782 A | 2/1993 |
| JP | 5120335 A | 5/1993 |
| JP | 981569 A | 3/1997 |
| JP | 9114836 A | 5/1997 |

\* cited by examiner

Primary Examiner—Stephen S. Hong
(74) Attorney, Agent, or Firm—Birch, Stewart, Kolasch & Birch, LLP

(57) ABSTRACT

A method for processing a document wherein, on the transmission side, information is stored in the document for specifying an element of the document whose contents should be changed if necessary according to the conditions of a communication destination. A document processed according to the conditions of the transmission side is analyzed to extract the element of the document to be changed, and information indicating that the extracted element is the element whose contents are to be changed is attached to the extracted element and a document transmission is made. On the receiving side, information is stored for specifying an element whose contents should be changed if necessary according to the conditions of the receiving side and corrective information included with the contents is stored, so that the received document is analyzed and the element is extracted, and based on the stored corrective information the contents of the extracted element are changed according to the communication destination conditions. Furthermore, a machine translation apparatus is included which processes an HTML document that includes hyperlinks between translated sentences, words, etc. and the corresponding original sentences, words, etc. and/or the corresponding dictionary data.

9 Claims, 17 Drawing Sheets

| CONTENTS CHANGE PART NAME | EXPLANATION | CONTENTS CHANGE PART GENERATION RULE |
|---|---|---|
| <TIME ORIG=time VAR=time > | REFERENCE TIME(T1) CONTENTS CHANGE PART TIME(T2) time-±dd±hh ff±mmddyy | T1 + TIME DIFFERENCE + T2 |
| <MONEY ORIG=YEN DEST=DOLLAR VALUE=num > | TRANSMISSION SIDE CURRENCY(C1) RECEIVING SIDE CURRENCY(C2) rate-nnnn.nnn | OBTAIN RATE FROM CONTENTS CHANGE DB TO CALCULATE VALUE ON RECEIVING SIDE |
| <MSG GREET=period > | KIND OF GREETINGS period-MORNING,AFTERNOON,NIGHT | GREETINGS APPROPRIATE TO LOCAL TIME |

| REGION | TIME DIFFERENCE | RELIGION |
|---|---|---|
| USA | GMT-0800 LOS ANGELES<br>GMT-0400 NEW YORK | CHRISTIANITY |
| · | · | · |
| UK | GMT+0000 LONDON | CHRISTIANITY |
| SAUDI ARABIA | GMT+0100 | ISLAM |
| · | | · |
| JAPAN | GMT+0900 | · |
| · | | |

A3 → CHRISTIANITY 203
(303)

| PERIOD | RELIGION | SEASONAL GREETINGS | REMARKS |
|---|---|---|---|
| DEC. 20-25 | CHRISTIANITY | "Merry Christmat" | |
| | WITHOUT RELIGION | "Season's Greetings"<br>"Happy Holidays" | |
| JAN. 1-7 | | "Happy New Year"<br>"Season's Greetings"<br>"Happy Holidays" | |
| SEPT. (ISLAMIC CALENDAR) | ISLAM | | ...IN FASTING PERIOD... |

FIG. 4

| REGION | EXCHANGE RATE |
|--------|---------------|
| USA | 1.00 |
| · | |
| UK | 1.12 |
| | |
| · | |
| JAPAN | 120 |
| · | |

Subject: Opening a checking account

September 13, 1996

Mr. Paul Smith
Manager
The First Bank of Old Mexico

Dear Mr. Smith,

I would like to open a checking account under the name of Sankai Syoji. I am enclosing my signature and a $1,000 check for opening the account.

Sincerely Yours,

Taro Suzuki

CEO

FIG. 14

```
<HTML>
<HEAD>
<TITLE>Letter Translation</TITLE>
</HEAD>
<P>
Subject:
<a name="J2b"></a>
<A href="dict.htm#J1" target="win3">当座預金口座</A>の
<a name="J2b"></a>
<A href="dict.htm#J2" target="win3">開設</A><BR><BR>
<DIV align="right">
<a name="J3"></a>
<A href="english.htm#J3" target="win2"> 96年 9 月13日 </A>
</DIV>
<P><BR><BR>
<a name="J4"></a>
Mr. Paul Smith<BR>Manager<BR>The First Bank of Old Mexico<BR><BR>
Smith 様;<BR><BR>
<a name="J11f"></a>
<A href="english.htm#J11f" target="win1"> 山海商事</A>の
<a name="J11e"></a>
```

FIG. 15A

```
<A href="dict.htm#J6" target="win3">名義</A>にて
<a name="J11d"></a>
<A href="dict.htm#J1" target="win3">当座預金口座</A>を
<a name="J11c"></a>
<A href="english.htm#J11c" target="win1"> 開設</A>
<a name="J11b"></a>
<A href="english.htm#J11b" target="win1"> したく</A>
<A href="english.htm#J11g" target="win1"> よろしくお願いいたします。</A><BR><BR>
.
.
<a name="J13"></a>
<A href="english.htm#J13" target="win1">敬具</A><BR>
<a name="J14"></a>
<A href="english.htm#J14" target="win1">鈴木太郎</A><BR>
<a name="J15"></a>
<A href="english.htm#J15" target="win1">代表取締役</A><BR><BR>
</BODY>
</HTML>
```

FIG. 15B

```
Mr. Paul Smith
Manager
The First Bank of Old Mexico

Smith様

山海商事の名義にて当座預金口座を開設したく、よろしくお願い
いたします。

よろしくお取り計り下さい。

私の署名と１０００ドルを小切手にて口座開設用に同封します。

敬具
鈴木太郎
代表取締役
```

---

```
Mr. Paul Smith                        checking
Manager                               account
The First Bank of Old Mexico          当座預金口座
                                      小切手口座

Dear Mr. Smith,                       opening
                                      空き (NOUN)
I would like to open a checking       開設 (NOUN)
account under the name of Sankai      ・  (VERB)
Syoji.                                ・
(An expression of request in polite
form. Omitted in English)             September
                                      9月 (NOUN)

name
                                      名前 (NOUN)
```

FIG. 16

DOCUMENT PREPARATION METHOD AND MACHINE TRANSLATION DEVICE

This application is the national phase under 35 U.S.C. §371 of prior PCT International Application No. PCT/JP98/01502 which has an International filing date of Mar. 30, 1998 which designated the United States of America, the entire contents of which are hereby incorporated by reference.

FIELD OF THE INVENTION

The present invention relates to a method for processing a document to cause the transmission destination to change the document according to the conditions of a place in which a receiver reads the document. Such conditions include time, season, amount of money, religion and the like included in a type of document such as an electronic mail message to a foreign country. The present invention also relates to a method for processing a document for changing the contents of the above elements which are contained in the transmitted document, and a machine translation apparatus for translating, for example, an English sentence containing information searched by a browser which searches and displays information offered by WWW (World Wide Web), into Japanese.

DESCRIPTION OF RELATED ART

In the case of describing greetings appropriate to time, season, etc. on an electronic mail message to be sent abroad, it is desirable to describe the greetings appropriate to time and season according to the conditions of the destination country in consideration of a time difference from the destination country, local time of the arrival of the electronic mail at the destination country, season, religion in the destination country, etc. For instance, in the case of transmitting an electronic mail message to the USA from Japan at night, the suitable greeting is "Good morning".

Especially, when a time is included in the body of a letter, unless the time is described by converting into the local time in the destination country, there is the possibility that the receiver misunderstands the time.

Furthermore, by the Internet communication boom, there have been increase in the number of users who receive electronic mail messages from foreign countries or browse the information offered by the WWW. Consequently, there are high demands for software for translating the electronic mail messages received from foreign countries on the Internet, information distributed over the Internet, etc. into Japanese, and a large number of translation software are commercialized.

However, when the user is unfamiliar with the conditions of the destination country, the user is required to gather information about the conditions of the country through book, on-line, etc. and the drafting of an electronic mail message becomes complicated. Conventionally, however, there has been no such supporting means taken as to draft a document in consideration of conditions of another country, such as a time difference from the destination country, season, amount of money, religion, etc. of the destination country.

In the present state, there has been no translation software providing sufficient quality for practical use. Accordingly, when the contents are not understandable from the translated sentence, the user tries to go back to the display of the original sentence, guesses the inadequately translated part, searches where the corresponding part lies in the original, and further, examines the meaning of the part by referring to the dictionary. Once the appropriate translation word has been found, the user returns the display to the previous Japanese translation and applies the examined results to the part which seems inadequate, and thus by repeating trial-and-error of adapting the examined results, is finally able to understand the contents. However, between languages having different word orders such as English and Japanese, it is difficult to search out the corresponding part.

Furthermore, in the present translation software, words which failed to be translated are left as the original words when generating a translation, and accordingly, the user is required to refer to the dictionary to seek the meaning of the words.

The present invention has been made to resolve the above problems. It is thus an object of the present invention to provide a document processing method in which a document appropriate to conditions of the transmission destination can be processed at the transmission destination, even through the user on the transmission side prepares a document without considering the conditions such as a time difference, season, amount of money, religion, etc. of the country of the receiver who reads the document, by causing the transmission destination to change the contents of the element according to the conditions of the country in which the receiver reads the document, such as time, season, amount of money, religion and the like included in the document such as an electronic mail message to a foreign country, and by changing the contents of the element as described above contained in the transmitted document.

Another object of the present invention is to provide a machine translation apparatus offering an excellent user interface which makes reference to a sentence or word in the original from the corresponding sentence or word in the translation easy, and makes reference to dictionary data corresponding to the word in the original easy by processing a document like an HTML (Hyper Text Markup Language) document which forms a link between the sentence, word, etc. of a translation and the corresponding original sentence, word, etc. acquired in the process of the translation, and by processing a document like an HTML document which forms a link between the original language and the corresponding dictionary data acquired in the process of the translation with making reference to dictionary data base.

SUMMARY OF THE INVENTION

The document processing method of the present invention is characterized in that, in a method for processing a document containing an element whose contents are to be changed according to conditions of a place where a communication terminal apparatus for reading the document is disposed, information for specifying the element is stored, said element is extracted by analyzing the processed document according to conditions of the transmission side, the extracted element is attached with information indicating that the element is the element whose contents should be changed, and transmission is made.

By the above method, it becomes possible to have a transmission destination such as a terminal apparatus of a receiver, a server which stores a document that a receiver can refer to, and the like, modify a document containing an element whose contents are to be changed according to conditions of the country of the receiver who reads the document, such as time, season, amount of money, religion and the like included in the document such as an electronic mail message to a foreign country. Accordingly, the user on the transmission side need not prepare documents in consideration of the conditions of the country of the receiver who reads the document, such as time, season, amount of money, religion and the like, rather the document itself suits the conditions of the transmission destination which can be processed on the receiving side.

The document processing method of the present invention is characterized in that, in a method for processing a document appropriate to a place where a communication terminal apparatus for reading said document is disposed from a received document, by storing information for specifying an element whose contents are to be changed to the contents appropriate to the above conditions and corrective information for changing said contents, extracting said element by analyzing the received document, and modifying the contents of the extracted element into the contents appropriate to the above conditions.

By the above method, transmission destination such as a terminal apparatus of a receiver, a server which stores a document that a receiver can refer to, and the like, can modify a document containing an element whose contents are to be changed according to conditions of the country of the receiver who reads the document, such as time, season, amount of money, religion and the like included in the document such as an electronic mail to a foreign country. Accordingly, the user on the transmission side need not prepare a document in consideration of the conditions of the country of the receiver who reads the document, such as time, season, amount of money, religion and the like, rather the document itself suits the conditions of the transmission destination which can be processed on the receiving side.

The document processing method of the present invention is characterized in that, in a method for processing a document containing an element whose contents are to be changed according to conditions of a place where a communication terminal apparatus for reading the document is disposed, information for specifying the element is stored, said element is extracted by analyzing the processed document according to conditions of the transmission side, the extracted element is attached with information indicating that the extracted element is the element whose contents are to be changed according to said conditions together with reference specifying information for specifying a reference destination in which corrective information for changing the contents appropriate to the conditions of the place where the communication terminal apparatus for reading said document is disposed is memorized, and transmission is made.

By the above method, it is possible to cause the transmission destination which is operable under the same operation system as the transmission side but is different in type of machine or utilize different application software such as mail software to modify the contents of the element whose contents are to be modified according to the conditions of the country of the receiver who reads the document, such as time, season, amount of money, religion, etc. contained in the document such as an electronic mail message. Accordingly, the transmission side user need not prepare the document in consideration of the conditions such as a time difference, season, amount of money, religion, etc. of the country of the receiver who reads the document rather the document itself suits the conditions of the transmission destination which can be processed on the receiving side.

The document processing method of the present invention is characterized in that, in a method for processing a document appropriate to conditions of a place where a communication terminal apparatus for reading the document is disposed from a received document to which are attached information for specifying a reference destination which stores corrective information for modifying the contents according to said conditions along with information indicating that the contents are to be modified according to the above conditions, the element is extracted by analyzing the received document, the reference destination specified by the reference specifying information attached to the extracted element is referred, and based on the corrective information stored in the reference destination, the contents of the extracted element is changed to the contents appropriate to the conditions as mentioned above.

Accordingly, the transmission destination which is different in type of machine or utilizes different application software such as mail software but is operable under the same operation system as that of the transmission side, can change the contents of the element whose contents are to be changed according to the conditions of the country of the receiver who reads the document, such as time, season, amount of money, religion and the like included in the document such as an electronic mail. Accordingly, the user on the transmission side need not prepare the document in consideration of the conditions of the country of the receiver who reads the document, such as a time difference, season, amount of money, religion and the like, rather the document itself suits the conditions of the transmission destination which can be processed on the receiving side.

The document processing method of the present invention is characterized by restoring a document processed according to conditions of the transmission side and displaying said document correspondingly to a document modified to the contents appropriate to conditions of a place where a communication terminal apparatus for reading the document is disposed.

By the above method, the document receiving side is enabled to compare the two documents to confirm places modified to the contents appropriate to the conditions of the place where the communication terminal for reading the document is disposed.

The machine translation apparatus of the present invention is characterized, in a machine translation apparatus for generating a translation by analyzing the original and referring to a dictionary data base in which dictionary data including selected words for a translation from the original word is stored, by comprising link document generating means for generating a document for forming a link between a constituting element of the original and a constituting element of a translation corresponding to the constituting element of the original; display means for displaying the original and the translation; and display control means for accepting a designation on the displayed translation or on the constituting element of the original and causing said display means to display the portion of the original or translation corresponding to said constituting element.

The machine translation apparatus of the present invention generates a document like an HTML document which forms a link between a constituting element such as a sentence, word, etc. of the original and a corresponding constituting element such as a sentence, word, etc. of the translation, acquired in the process of generating the translation by analyzing the original and referring to the dictionary data base. When the user designates the displayed translation or original sentence, word, etc., the apparatus displays the original or translation sentence corresponding to the designated sentence or word.

By the above, even between the languages having a different word order, the user can easily compare the original with the translation.

The machine translation apparatus of the present invention is characterized in that the link document generating means have means for generating a document for forming a link between the original word and the dictionary data corresponding to said original word; the display means have means for displaying the original word and the dictionary data; and the display control means have means for accepting a designation on the displayed original word and causing the display means to display the dictionary data corresponding to said original word.

The machine translation apparatus of the present invention displays the dictionary data corresponding to the designated original word, in addition to the above, when the user designates the original word or the word not translated in the translation.

By the above, the user can easily obtain other selected words for the translation.

The machine translation apparatus of the present invention is characterized in that the display control means are means for causing the display means to display the original of the designated constituting element and the translation corresponding to said constituting element, or display the designated original word and the dictionary data corresponding to the designated original word, by dividing the display region.

The machine translation apparatus of the present invention is to have the display means display the sentence, word, etc. designated by the user as above and the corresponding sentence, word, etc. of the translation by dividing the display region. Also, it causes the display means to display the original word designated by the user in the original or translation and the corresponding dictionary data by dividing the display region.

By the above, comparison between the original and its translation, or between the original word and the dictionary data thereof, is more facilitated.

BRIEF DESCRIPTION OF THE DRAWINGS

FIG. 3 is a conceptual view of the concrete example of a contents change rule table;

FIG. 4 is a conceptual view of the concrete example of a static information DB;

FIG. 5 is a conceptual view of the concrete example of a dynamic information DB;

FIG. 14 is a view to show an example of an English sentence which is to be the subject of translation;

FIGS. 15A and 15B are a view to show an example of the HTML document generated by the machine translation apparatus of the present invention; and FIG. 16 is a view of an example of the screen display of the machine translation apparatus of the present invention.

DESCRIPTION OF THE PREFERRED EMBODIMENTS

Figure 1:
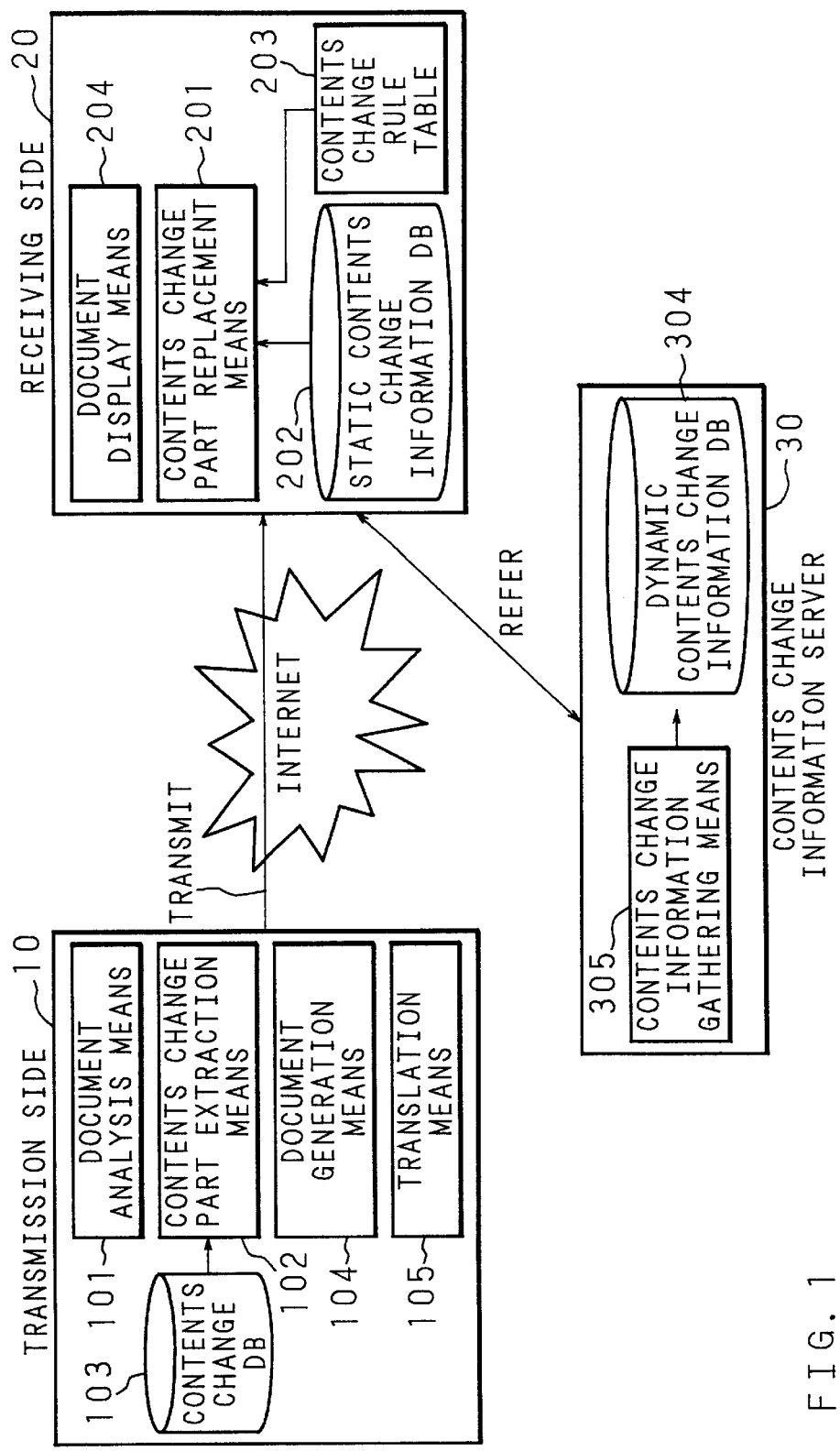
FIG. 1 is a block diagram to show the constitution of an example of the communication system for executing the document processing method of the present invention.

FIG. 1 is a block diagram to show the constitution of an example of the communication system for executing the document processing method of the present invention.

A transmission side communication terminal apparatus 10, receiving side communication terminal apparatus 20, and contents change information server 30 which periodically gathers information such as a stock price, foreign exchange rate, etc. are connected to communication network such as the Internet. The communication network is not limited to the Internet.

In the transmission side communication terminal apparatus 10, document analysis means 101 performs morphological analysis of the document prepared by the user according to the conditions on the transmission side, such as time, season, amount of money, religion, etc.

Element change part extraction means 102 extracts a contents change part from the document analyzed by the document analysis means 101 referring to a contents change data base (DB) 103 in which information (e.g., a tag name of an HTML document) for specifying an element (hereinafter to be referred to as a contents change part) whose contents are to be modified according to conditions such as time, season, amount of money, religion, etc. of a country, region, etc. in which a communication terminal apparatus of the transmission destination of the document is disposed is stored correspondingly to information such as a name of the contents change part (e.g., a tag name which begins with "<" as in the HTML document) to be attached to indicate that this element is the element which requires a change and data format of the contents change part. Also, the contents change DB 103 stores data of a time difference necessary for converting a time in a country in which the communication terminal apparatus 10 is disposed into GMT (Greenwich Mean Time).

Document generation means 104 of the communication terminal apparatus 10 on the transmission side replaces, in case the contents change part is, for example, an element related with time, a variable value of the time included in the contents change part with the time based on the GMT by referring to the GMT based time offered by the system. Further, translation means 105 translates the document generated by the document generation means 104 into the language of the transmission destination.

Contents change part replacement means 201 of the receiving side communication terminal apparatus 20 scans the received document from the beginning, and when it encounters a starting mark "<" in the contents change part name, it extracts the contents change part according to the syntax of a contents change rule table 203 in which are stored the contents change part name which indicates the element whose contents are to be modified according to the conditions of the country, region, etc. on the receiving side, such as time, season, amount of money, religion, etc., explanation (definition) on a variable included in the contents change part and its data format, etc., and the syntax consisting of contents change part generation rules and the like, and applies the contents change part generation rule, and referring to static contents change information data base (DB) 202 in which are stored a time difference, religion, seasonal greetings, etc. of each country and dynamic information data base (DB) 304 of the contents change information server 30 to be described later, changes the contents of the contents change part of the original document to the contents appropriate to the conditions of the receiving side. Also, in case of necessity, it adds the seasonal greetings appropriate to the conditions of the receiving side or deletes the contents not appropriate to the conditions of the receiving side.

Document display means 204 of the receiving side communication terminal apparatus 20 displays on the display unit the document in which the contents of the contents change part are replaced with the contents appropriate to the conditions on the receiving side by the contents change part replacement means 201.

In this case, the original document before replacement, and further the document of the original word before translation if the document before replacement is translated may be displayed along with the document after replacement. In order to realize this, there may be provided means for restoring the original document (not illustrated). Further, as in a machine translation apparatus to be described later, the constitution may be such as to have dictionary data bases for the original language and the translation language, so that the dictionary data can be referred to from the translated sentence, and the corresponding word of the original can be referred to from the translated word.

The contents change information server 30 is equipped with a dynamic contents change information DB 304 in which are stored dynamic information such as a foreign exchange rate, stock price, etc. and contents change information gathering means 305 for gathering the dynamic information by accessing periodically and non-periodically other servers on the Internet.

Figure 2:
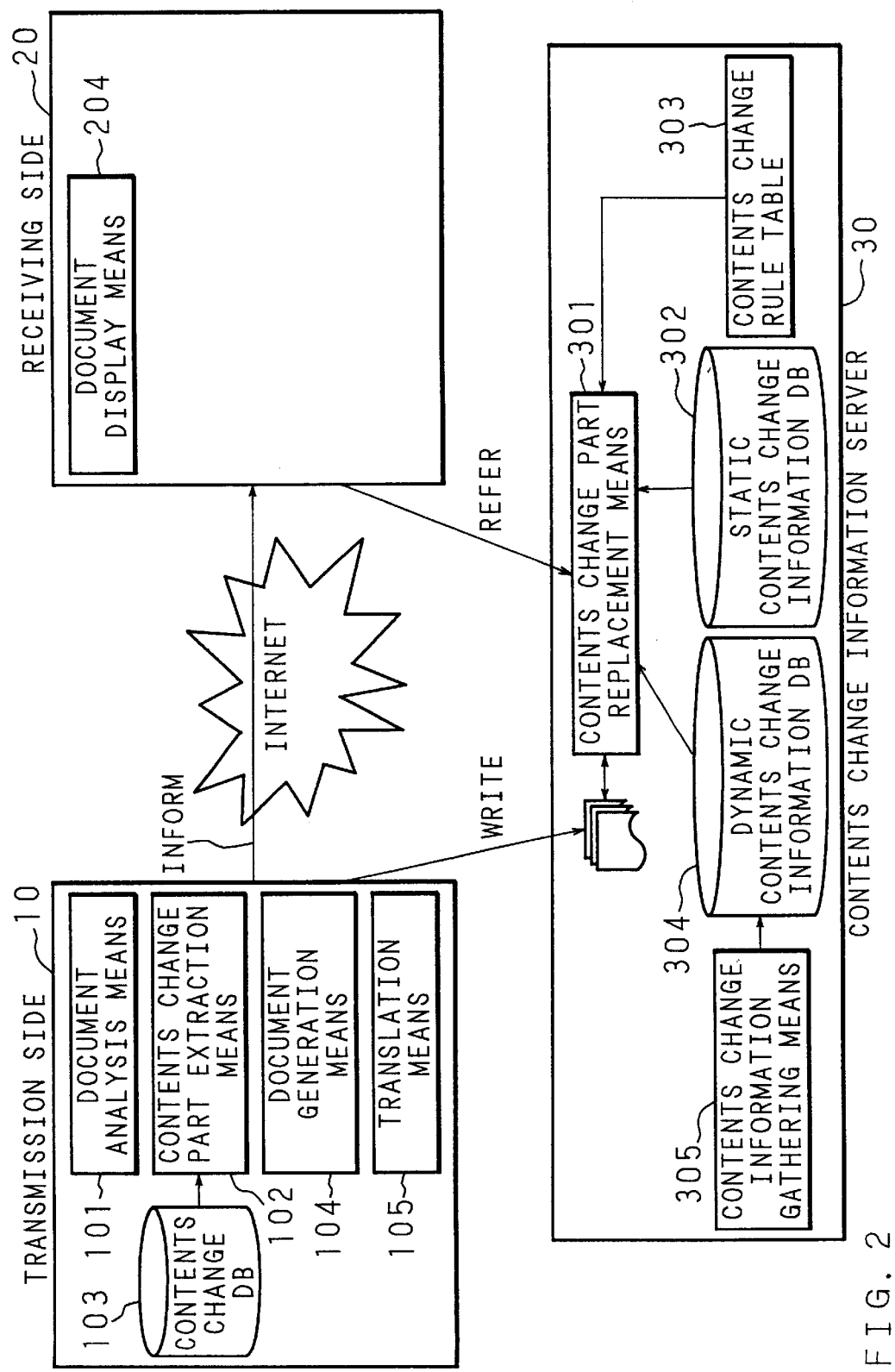
FIG. 2 is a block diagram to show the constitution of another example of the communication system for executing the document processing method of the present invention.

FIG. 2 is a block diagram to show the constitution of another example of the communication system for executing the document processing method of the present invention. To the same portions as or the corresponding portions to those of the system of FIG. 1, the same marks are assigned and the explanation thereof is partly omitted.

The communication system of FIG. 2 is the system to share documents among the plural communication terminal apparatuses (receiving side) 20 by storing the documents in the contents change information server 30. Accordingly, the document generated by the communication terminal apparatus 10 on the transmission side in the same manner as in the case of FIG. 1 is transmitted to the contents change information server 30, where contents change part replacement means 301 of the contents change information server 30 executes the contents change part replacement processing executed by the communication terminal apparatus 20 on the receiving side in FIG. 1 by referring to a static contents change information DB 302, contents change rule table 303, dynamic contents change information DB 304, etc.

The communication terminal apparatus 10 on the transmission side informs the communication terminal apparatus 20 on the receiving side of only the fact of having transmitted the document to the contents change information server 30. The document display means 204 in the communication terminal apparatus 20 on the receiving side refers to the contents change information server 30 and displays the document transmitted from the communication terminal apparatus 10 on the transmission side on the display in the same manner as described above.

In the communication systems of FIG. 1 and FIG. 2, the contents change rule table 203 (303), static contents change information DB 202 (302), and dynamic contents change information DB 304 correspond to the corrective information as mentioned above.

In the communication systems of FIG. 1 and FIG. 2, in cases where the operating system operates under the common programming method, by providing information like URL which specifies the above reference destination for a change from the transmission side and causing the receiving side to refer to the corrective information in the reference destination, it may become possible to have the receiving side which is different in type of machine but is operable under the same operation system as that of the transmission side, or utilizes different application software such as mail software, modify the contents of the contents changing part according to the conditions of the receiving side.

Figure 6:
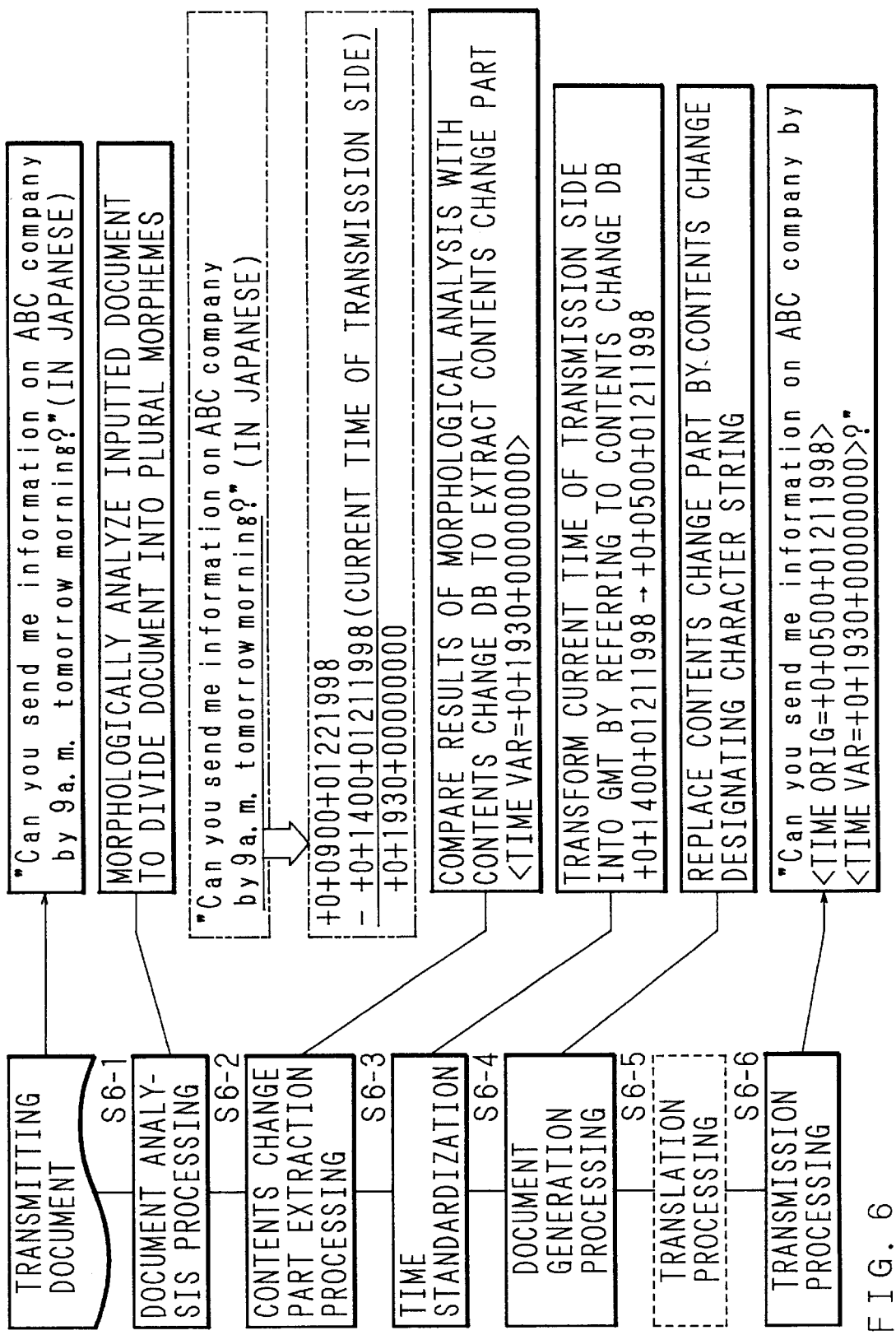
FIG. 6 is a view to show the concrete example of the process of a replacement in the contents change part.
Figure 7:
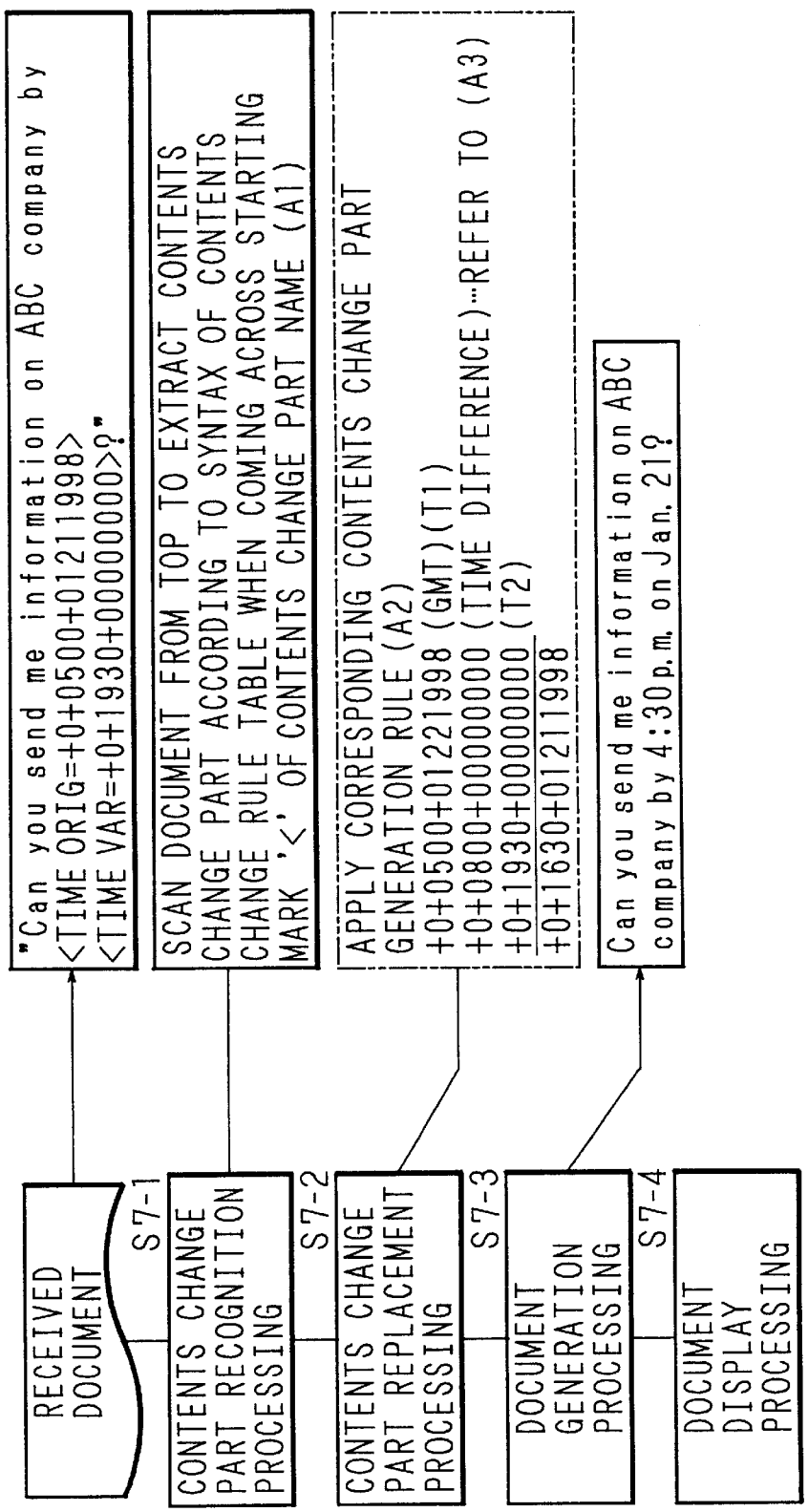
FIG. 7 is a view to show the concrete example of the process of a replacement in the contents change part.
Figure 8:
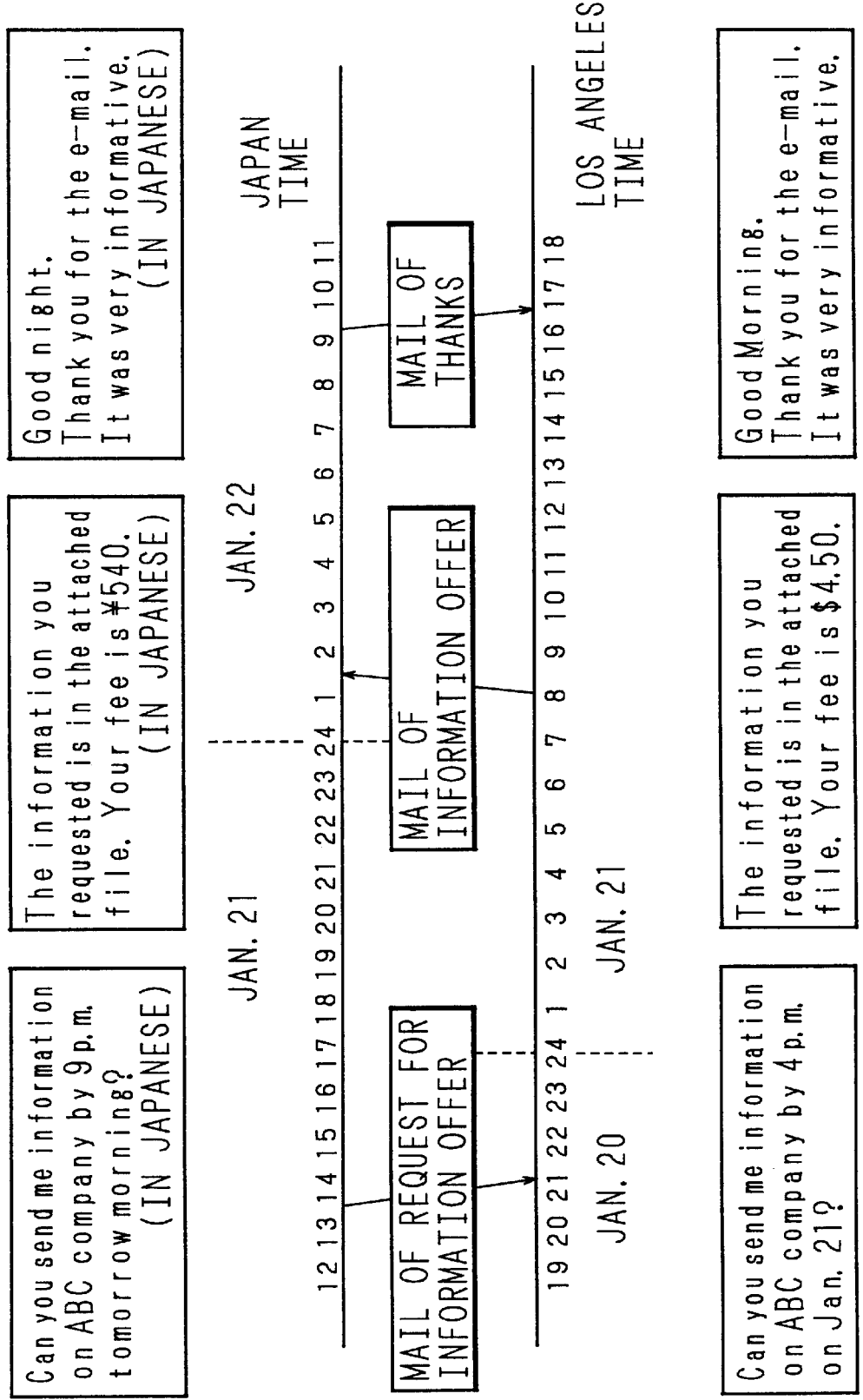
FIG. 8 is a flow chart to show the procedure of the document processing method of the present invention on the transmission side.
Figure 9:
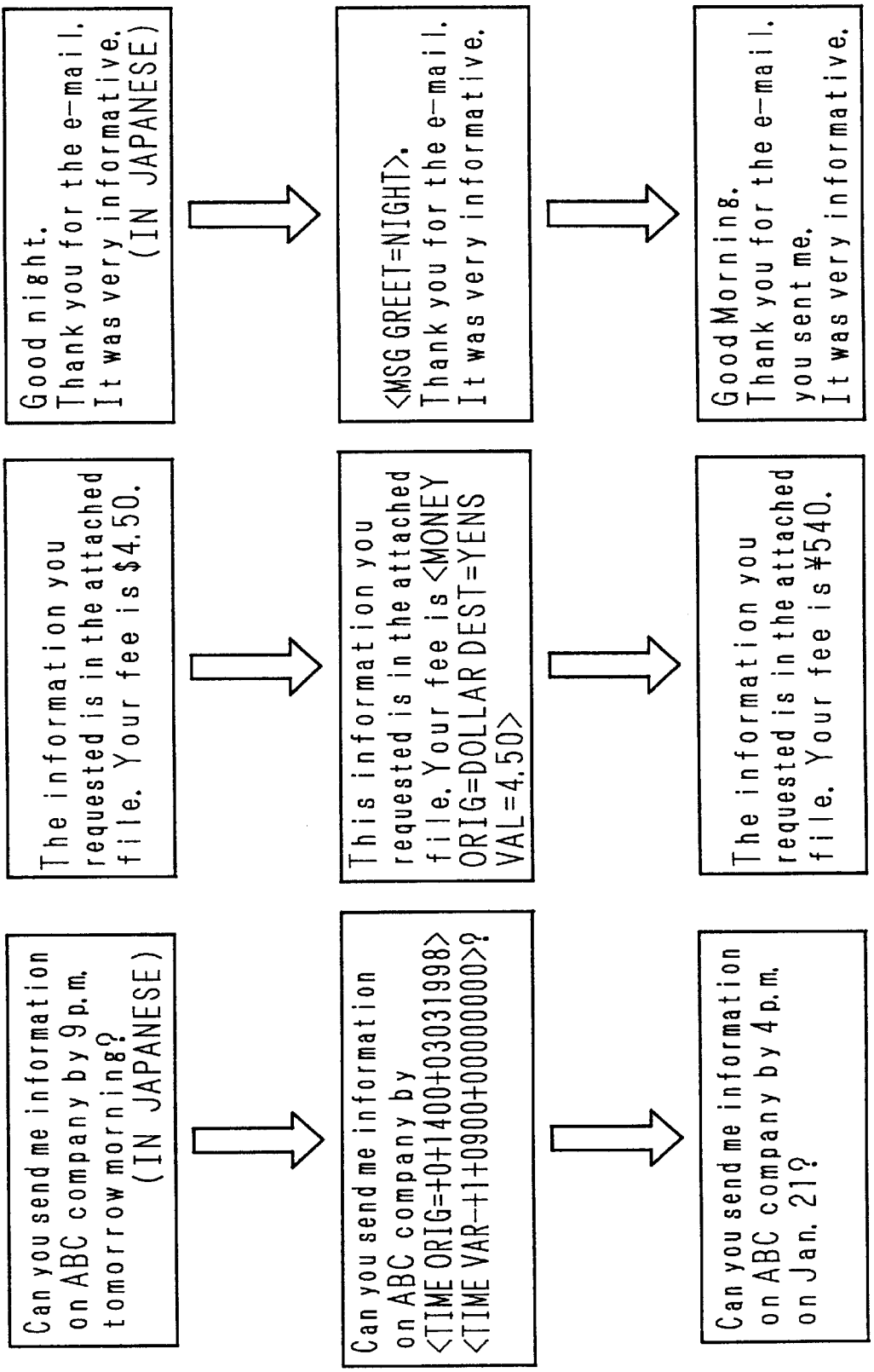
FIG. 9 is a flow chart to show the procedure of the document processing method of the present invention on the transmission destination side.

Next, the concrete procedures for the document processing method of the present invention are explained based on the concrete example of the contents change rule table of FIG. 3, concrete example of the static information DB of FIG. 4, concrete example of the dynamic information DB of FIG. 5, concrete example of the process of the contents change part replacement in FIG. 6 and FIG. 7, and flow charts of FIG. 8 and FIG. 9.

In the contents change rule table 203 (303) there is stored a contents change part generation rule correspondingly to a contents change part name indicating the contents change part, and explanation (definition) on a variable included in the contents change part and format thereof, as shown in FIG. 3.

In the static information DB 202 (302) there is stored static information covering the time difference, religion, religious seasonal greetings, remarks, etc. of each country, as shown in FIG. 4.

In the dynamic information DB 304, there is stored dynamic information such as an exchange rate of each country, as shown in FIG. 5.

Next, with respect to the concrete procedures for contents change part replacement in the case where an electronic mail message containing the message "Can you send me information on ABC company by 9 a.m. tomorrow morning?" is transmitted to the USA on Jan. 21, 1998, at 14:00 Japan time, explanation is made on the basis of the flow chart of FIG. 6 which shows the procedures on the transmission side, flow chart of FIG. 7 which shows the procedures at the destination of transmission, and the drawings of FIG. 8 and FIG. 9 which show the process of contents change part replacement.

The inputted document as prepared above prepared according to the conditions of the transmission side is morphologically analyzed and divided into a plurality of morphemes (Step S6-1). It is assumed that in this example "9 a.m. tomorrow morning" is defined to be described in the relative time ("+0+1930+00000000") which is obtainable as a difference from the current Japanese time [(+0+0900+01221998)−(+0+1400+01211998)].

In the contents change part extraction processing, results of the morphological analysis are compared with the contents change DB 103 and the contents change part "9 a.m. tomorrow morning" is extracted (Step S6-2).

Referring to the contents change DB 103, the current time in Japan ("+0+1400+01211998") which is transmission side is converted to GMT ("+0+0500+01211998") to carry out standardization of time (Step S6-3).

There is generated a document in which the contents change part is replaced by the contents change designating character string (Step S6-4), and if the translation is necessary, the translation processing is executed (Step S6-5), and the following document generated in Step S6-4 is transmitted to the communication terminal apparatus 20 on the receiving side or contents change information server 30 (Step S6-6).

Can you send me information on ABC company by
<TIME ORIG=+0+0500+01211998>
<TIME VAR=+0+1930+00000000> ?

In the transmission destination, the received document as above is scanned from the top, and when coming across the contents change part name starting mark "<", the contents change part as shown by A1 in FIG. 3 is extracted according to the corresponding syntax of the contents change rule table 203 (303) (Step S7-1).

The corresponding contents change part generation rule ("T1+time difference+T2" shown by A2 in FIG. 3) is applied, the time difference (A3 in FIG. 4) of static contents change information DB 202 (302) is referenced, the receiving side USA GMT (Japanese GMT+time difference) is added with the relative time (T2) so that the contents of the contents change part are replaced by the contents appropriate to the time on the receiving side ("+0+1630+01211998") (Step S7-2), the document having the contents appropriate to the conditions of the receiving side ("Can you send me information on ABC company by 4:30 p.m. on Jan. 21 ?") is generated (Step S7-3), and it is displayed on the display unit (Step S7-4).

As shown in FIG. 8 and FIG. 9, by the processing similar to that mentioned above, the document prepared on the transmission side is replaced by the document having the contents appropriate to the conditions of the receiving side (exchange rate, receiving time).

Further, besides replacing the contents contained in the transmission side document with the contents appropriate to the conditions of the receiving side, there may be added a cliché such as religious greetings or seasonal greetings prevailing on the receiving side, so as to add "Merry Christmas" for example to the electronic mail message to be transmitted to USA at the end of the year.

Alternatively, the contents contained in the transmitting side document, such as the contents relating to food, festival, etc. may be deleted from the electronic mail to be transmitted to, for example, Islamic zone during a fasting period, according to the conditions of the receiving side.

Figure 10:
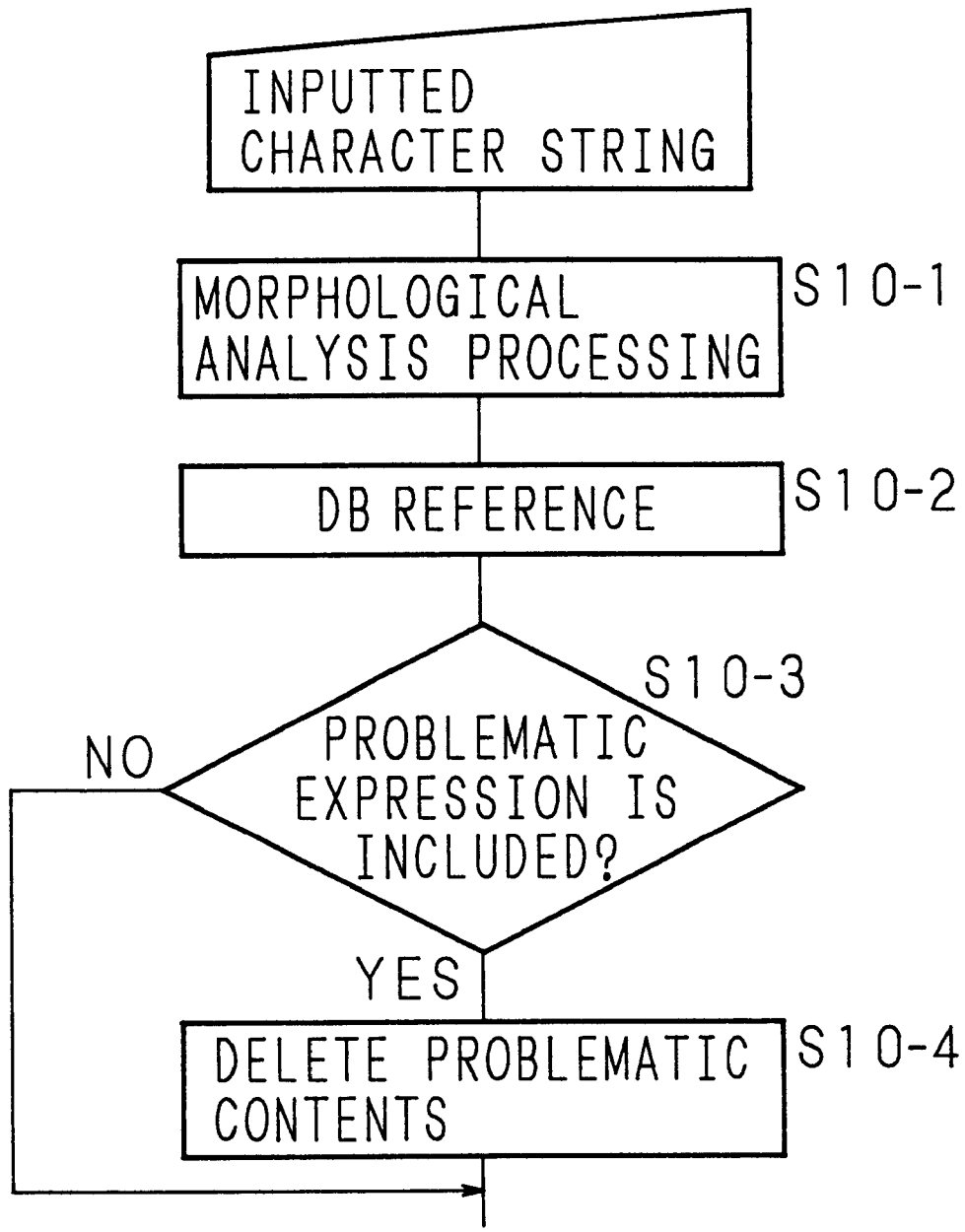
FIG. 10 is a flow chart to show another procedure of the document processing method of the present invention on the transmission destination side.

FIG. 10 is a flow chart to show the procedures for the deletion on the transmission destination side. The morphological analysis processing is made to the inputted character string (Step S10-1), the static DB 202 (302) is referenced (Step S10-2), and judgment is made as to whether there is any problematic expression or not (Step S10-3), and in case there is a problematic expression, the problematic contents are deleted (Step S10-4).

In case of displaying the document with the contents appropriate to the conditions of the receiving side replaced from the contents of the document prepared on the transmission side, the modified parts may be distinguishably shown, for example, by changing the display color, changing the font, adding the underline, etc.

Further, besides distinguishably showing the modified parts, the document prepared on the transmission side and the document after replacement on the receiving side may be displayed correspondingly by dividing the screen display.

By the above, in case the document on the transmission side is processed by the translation processing, relations can be formed not only between the parts of replacement but also between the words.

Figure 11:
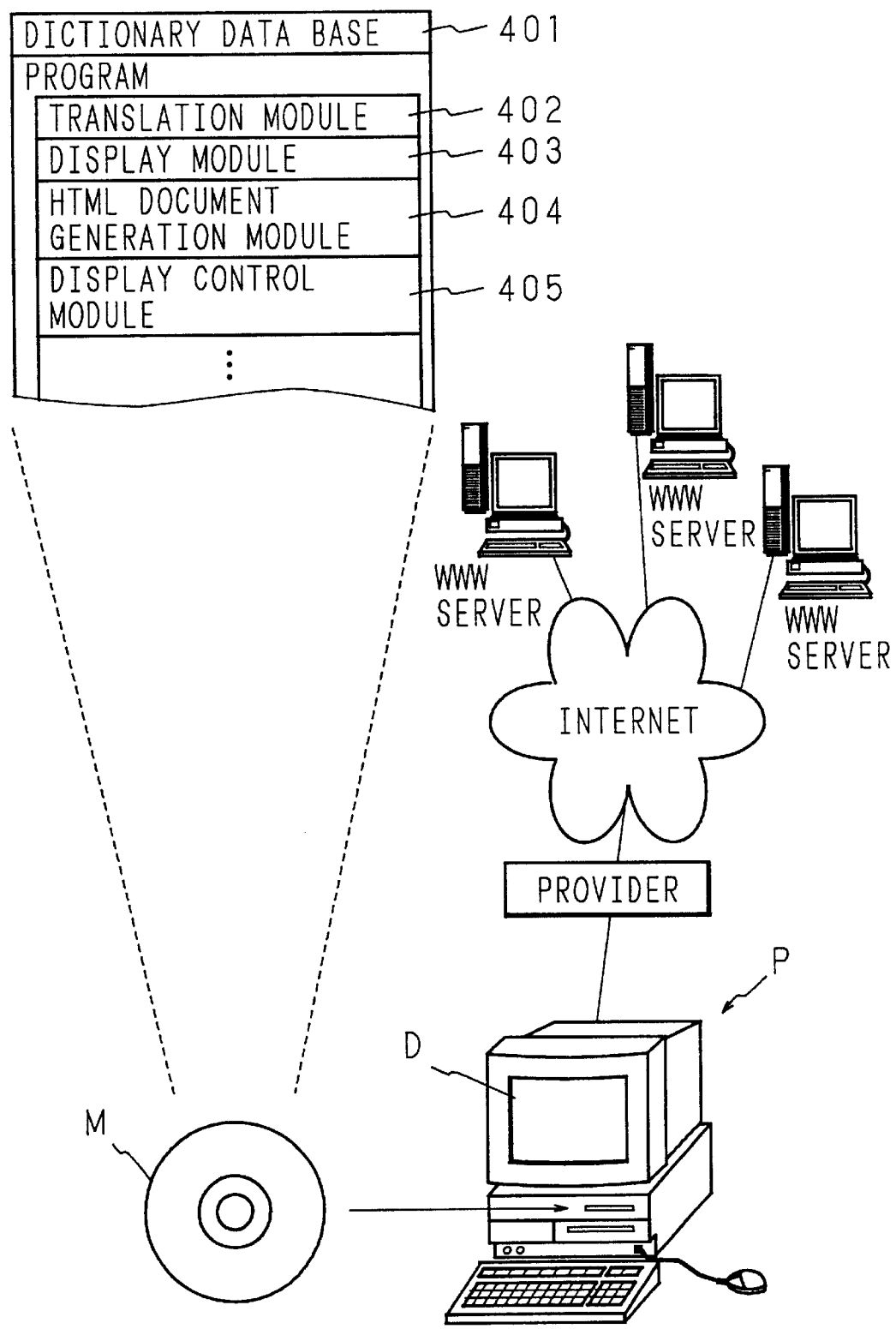
FIG. 11 is a schematic diagram to show the constitution of the machine translation apparatus of the present invention.

FIG. 11 is a schematic view showing the constitution of the machine translation apparatus of the present invention.

In this embodiment, it is assumed that a general-purpose personal computer P is loaded on its drive with a recording medium M such as a hard disk in which there is recorded a program related with translation as will be described later and a link related program, and operates as the machine translation apparatus of the present invention to display the original, translation, dictionary data, etc. on the display D. Also, the personal computer P is connected with the Internet through an appropriate provider to make it possible to search various information pages provided by the WWW servers. In the following explanation, the case of translating the English original into Japanese is taken as an example.

The recording medium M is recorded with a dictionary data base 401 entered with dictionary data containing English words, their meanings in Japanese, grammatical information, etc.

The recording medium M stores translation related programs including a translation module 402 which executes morphological analysis, parsing, syntax conversion, and of the original, and morpheme generation by referring to the dictionary data base 401 and a display module 403 which displays the contents of information by searching WWW and also display the results of translation of the translation module 402 on the screen.

Further, on the recording medium M, there are recorded programs which include an HTML document generation module 404 for generating a document in HTML for forming a Hyper link between the English word or English sentence of the original, and the Japanese word or Japanese sentence acquired in the process of translation by the translation module 402, and between the original or translated English words and the dictionary data in the dictionary data base 401 referenced in the process of translation, and a display control module 405 for having the display module 403 display a word, sentence, etc. of the original or of the translation corresponding to the designated word, sentence, etc. of the translation or the original, or the dictionary data corresponding to the designated English word, etc. in the respective divided regions of the display D, when the word, sentence, etc. of the translation or the original, or the English word in the original or the translation is designated by the pointing device such as a mouse.

Figure 12:
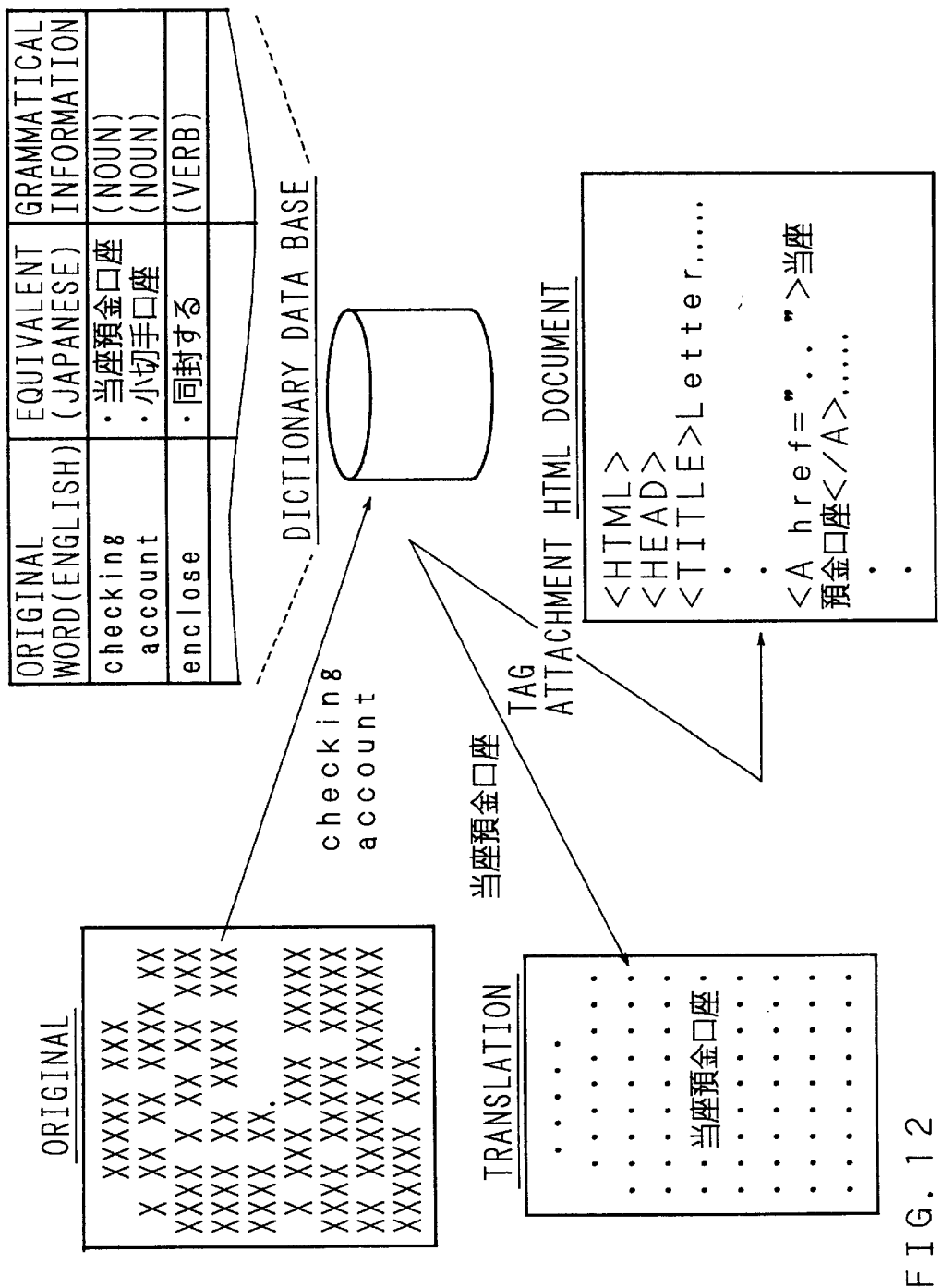
FIG. 12 is a schematic diagram to show the link forming procedure of the machine translation apparatus of the present invention.
Figure 13:
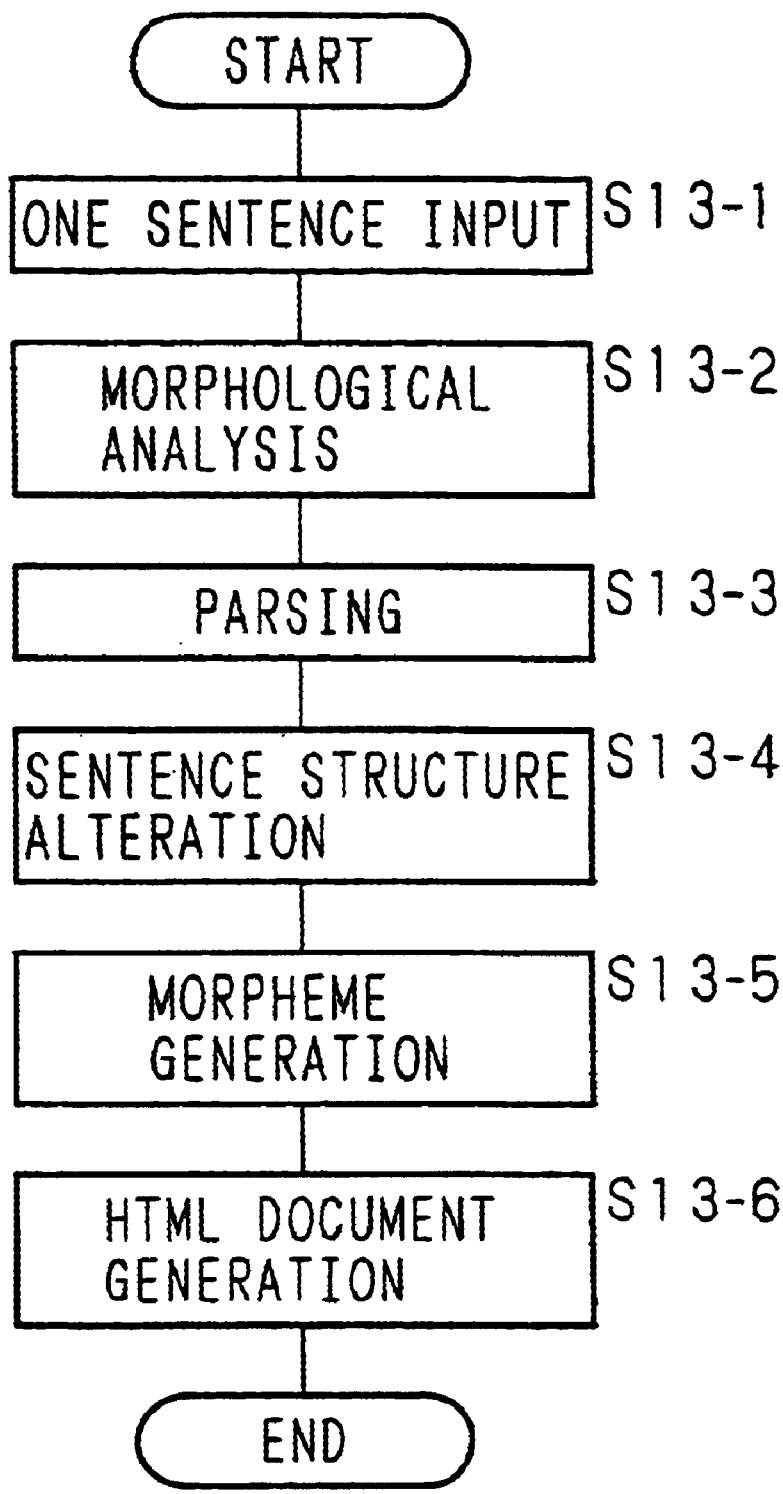
FIG. 13 is a flow chart of the operation of the machine translation apparatus of the present invention.

Next, the operation of the machine translation apparatus of the present invention will be explained on the basis of the schematic view of the link making procedures of FIG. 12, the flow chart of FIG. 13, the example of English text which is the subject of translation of FIG. 14, the example of the HTML document of FIGS. 15A and 15B, and the view of the screen display example of FIG. 16.

When a sentence of text is input from the World Wide Web for example (Step S13-1), a string of characters of the input sentence is analyzed into morphemes which are the minimum word units having the meanings, respectively, and morphological analysis is performed for clarifying a part of speech, conjugation, etc. of the analyzed words (Step S13-2). In case the input original text is the HTML document, prior to the morphological analysis, an HTML analysis is performed for separating the HTML document into HTML information and text information.

Next, the grammar information of the dictionary data base 401 is referenced to carry out a parsing for clarifying the grammatical structure of the original analyzed into the morphemes (Step S13-3), and a sentence structure alteration is carried out to rearrange the morphemes of the original sentence to conform to the grammatical structure of the objective language (Step S13-4). From the rearranged morphemes of the original words, morphemes which meet the grammar of the objective language are generated (Sep S13-5) to complete the translation processing.

Lastly, the information on correspondence between the morpheme of the original and the morpheme of the translation, and the information on correspondence between the morpheme of the original and the dictionary data obtained in the process of the above translation processing are stored, and the tags are attached respectively to the morpheme of the translation and to the data of the file names and stored positions where the corresponding morpheme of the original text and the dictionary data are stored respectively, and an HTML document to form a Hyper link between them is generated (Step S13-6).

FIGS. 15A and 15B are the example of the HTML document generated by the translation from the English text of FIG. 14, and FIG. 16 is the view showing the example of screen display. In this embodiment, the display region of display D is divided into three areas of an original display area 411, translation display area 412, and dictionary data display area 413, so that the original display area 411 and the translation display area 412 scroll automatically to follow the scrolling of each other.

In the HTML, the step jumps to the file held between the tag "<A href" and the tag ">". Accordingly, for example, when "checking account (in Japanese)" is clicked in the translation display area 412 of FIG. 16, the step jumps to the file having the file name "win 3" in which the corresponding original sentence is stored, and the English sentence of the file is displayed in the original display area 411.

Furthermore, when "checking account (in English)" is clicked in the original display area 411 of FIG. 16, the dictionary data of the file name "dict. htm#J1" in which the dictionary data corresponding to this English word is stored is displayed in the dictionary data display area 413.

Although, in this embodiment, a style of display by dividing the display region into three areas has been explained, the constitution to divide the display area into two areas to display the combination of the original and translation, original and dictionary data, or translation and dictionary data may be applicable.

In this embodiment, explanation has been given on the constitution to form a Hyper link between the original word and the dictionary data thereof. However, such a style may be adopted as to form a Hyper link between the word in the translation and the dictionary data, and display the dictionary data according to clicking the word in the translation.

Although, in this example, description has been made on the style in which the program related with the translation including the dictionary data base, translation module and display module and the program related with the link including the HTML document generation module and display control module are recorded in the same recording medium, these programs may be recorded in the separate recording media.

Furthermore, similar effect is obtainable by the style that the apparatus is pre-installed with only the program related with the translation, or both programs, or a part of modules.

The recording medium is not necessarily limited to the hard disk but other recording medium can be used, and further, even by the style that both of these programs are or one of them is provided by on-line, the same effect is obtainable.

Industrial Applicability

As described above, the document processing method of the present invention has an excellent effect that a document appropriate to the conditions of the transmission destination can be processed at the destination of transmission, even though the user on the transmission side prepares a document without consideration of the conditions such as a time difference, season, amount of money, religion, etc. of the country of the receiver who reads the document, by causing the transmission destination to change the contents of the element to be changed, according to the conditions of the country in which the receiver reads the document, such as time, season, amount of money, religion and the like included in the document such as an electronic mail to a foreign country, and by changing the contents of the element as described above contained in the transmitted document.

The machine translation apparatus of the present invention processes a document like an HTML document which forms a link between a sentence, word, etc. of the translation and the corresponding sentence, word, etc. of the original acquired in the process of generating a translation, or processes a document like an HTML document which forms a link between a word of the original and the corresponding dictionary data obtained by referring to the dictionary data base in the process of generating the translation. Accordingly, the apparatus has an excellent effect on offering an excellent user interface to facilitate reference to the corresponding sentence, word etc. of the original from the sentence, word etc. of the translation, and reference to the corresponding dictionary data from the word of the original.

What is claimed is:

1. A machine translation apparatus for generating a translated document by analyzing an original set of text while referring to a dictionary data base including at least one selected word suitable for constituting a translation from an original word, comprising:

a link document generator generating a document including a link between at least one original word and at least one translated word;

a display displaying a part of the original set of text and a part of the translated document; and a display control accepting input for designating at least one translated word and at least one original word, wherein upon receiving input designating the at least one translated word, the display control causes the display to display a part of the original set of text including at least one original word which the designated, translated word is a translation from, and upon receiving input designating the at least one original word, the display control causes the display to display a part of the translated document including at least one translated word which is a translation from the designated original word.

2. The machine translation apparatus according to claim 1, wherein:

the document contains a link between the at least one original word and dictionary data corresponding to the at least one original word;

the display displays the at least one original word and the dictionary data corresponding to the at least one original word; and the display control accepts input for designating at least one original word, wherein upon receiving input designating the at least one original word the display control causes the display to display the dictionary data corresponding to the at least one original word.

3. The machine translation apparatus according to claim 1 or 2, wherein the display control causes the display to display the at least one original word designated as input to the display control and the at least one corresponding translated word, or the display control causes the display to display the at least one original word designated as input to the display control and the corresponding dictionary data, by dividing the display viewing area into at least two separate regions.

4. A method for generating a translated document by analyzing an original set of text in a first language while referring to a dictionary database including at least one selected word suitable for constituting a translation from an original word, comprising the steps of:

generating a document that includes a link between at least one original word or phrase and at least one translated word or phrase; and displaying a part of the original set of text and a part of the translated document, wherein input is accepted for selecting at least one translated word or phrase in order to display a part of the original set of text including original word or phrase which the selected, translated word or phrase is a translation from, and input is accepted for selecting at least one original word or phrase in order to display a part of the translated document including at least one translated word or phrase which is a translation from the selected original word or phrase.

5. The method for generating a translated document according to claim 4, wherein the document contains a link between the at least one original word and dictionary data corresponding to the at least one original word or phrase.

6. The method for generating a translated document according to claim 4, further comprising the step of displaying the at least one original word or phrase and its corresponding dictionary data.

7. The method for generating a translated document according to claim 4, further comprising the step of accepting input for selecting at least one original word or phrase in order to display its corresponding dictionary data.

8. The method for generating a translated document according to claim 4, further comprising the step of displaying the at least one selected original or translated word or phrase and the at least one corresponding translated word in a divided viewing area, wherein the divided viewing area is divided into at least two viewing regions.

9. The method for generating a translated document according to claim 4, further comprising the step of displaying the at least one selected original word or phrase and the at least one corresponding dictionary data in a divided viewing area, wherein the divided viewing area is divided into at least two viewing regions.

* * * * *